US009960609B2

(12) United States Patent
Muralidhar et al.

(10) Patent No.: US 9,960,609 B2
(45) Date of Patent: May 1, 2018

(54) METHOD AND SYSTEM FOR CONFIGURING A TRANSPORT REFRIGERATION UNIT BATTERY CHARGER FOR USE IN A TRANSPORT REFRIGERATION SYSTEM

(71) Applicant: THERMO KING CORPORATION, Minneapolis, MN (US)

(72) Inventors: Ashok Muralidhar, Eagan, MN (US); Matthew S. Nelson, Cottage Grove, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 174 days.

(21) Appl. No.: 14/582,270

(22) Filed: Dec. 24, 2014

(65) Prior Publication Data

US 2015/0188323 A1 Jul. 2, 2015

Related U.S. Application Data

(60) Provisional application No. 61/920,890, filed on Dec. 26, 2013.

(51) Int. Cl.
*H02J 7/00* (2006.01)
*H02J 7/14* (2006.01)
*B60H 1/32* (2006.01)

(52) U.S. Cl.
CPC .......... *H02J 7/0004* (2013.01); *B60H 1/3232* (2013.01); *H02J 7/007* (2013.01); *H02J 7/0073* (2013.01)

(58) Field of Classification Search
USPC ....... 320/134, 136, 103, 137, 162, 104, 106, 320/107, 108, 109, 112; 307/10.1, 104,
(Continued)

(56) References Cited

U.S. PATENT DOCUMENTS

| 3,974,660 A | 8/1976 | Farr |
|---|---|---|
| 5,262,704 A | 11/1993 | Farr |

(Continued)

FOREIGN PATENT DOCUMENTS

| CN | 1297599 | 5/2001 |
|---|---|---|
| CN | 1950998 | 4/2007 |

(Continued)

OTHER PUBLICATIONS

Supplementary European Search Report issued in European Application No. 13868386.7 dated Sep. 14, 2016 (5 pages).

(Continued)

*Primary Examiner* — Alexis Pacheco
(74) *Attorney, Agent, or Firm* — Hamre, Schumann, Mueller & Larson, P.C.

(57) ABSTRACT

A system and method for configuring a transport refrigeration unit (TRU) battery charger in a transport refrigeration system (TRS) is provided. The method includes receiving battery topology data indicating a battery topology of a TRU battery equipped in the TRS. The method also includes determining specific parameters for configuring a battery charging algorithm based on the battery topology data. Also, the method includes the TRU battery charger configuring the battery charging algorithm based on the specific parameters.

20 Claims, 3 Drawing Sheets

(58) Field of Classification Search
USPC .......................................................... 307/9.1
See application file for complete search history.

(56) References Cited

U.S. PATENT DOCUMENTS

| | | | |
|---|---|---|---|
| 5,303,560 | A | 4/1994 | Hanson et al. |
| 5,557,941 | A | 9/1996 | Hanson et al. |
| 5,596,878 | A | 1/1997 | Hanson et al. |
| 5,623,197 | A | 4/1997 | Roseman et al. |
| 5,684,387 | A | 11/1997 | Patino |
| 6,321,550 | B1 | 11/2001 | Chopko et al. |
| 6,690,140 | B2 * | 2/2004 | Larson .................. H02J 7/1453 307/10.1 |
| 7,750,602 | B2 | 7/2010 | Asada |
| 7,765,831 | B2 | 8/2010 | Rodriguez et al. |
| 7,791,310 | B2 | 9/2010 | Luz et al. |
| 8,134,340 | B2 | 3/2012 | Park |
| 8,314,588 | B2 | 11/2012 | Lazarovich et al. |
| 8,330,412 | B2 | 12/2012 | Lattin |
| 9,407,108 | B2 | 8/2016 | Muralidhar et al. |
| 2004/0231831 | A1 | 11/2004 | Houck et al. |
| 2005/0237025 | A1 * | 10/2005 | Osswald ............... H02J 7/0032 320/128 |
| 2006/0260335 | A1 | 11/2006 | Montuoro et al. |
| 2007/0151273 | A1 | 7/2007 | Nelson et al. |
| 2008/0238357 | A1 | 10/2008 | Bourilkov et al. |
| 2010/0045243 | A1 * | 2/2010 | Mizuno ................. A63F 13/08 320/162 |
| 2010/0274604 | A1 | 10/2010 | Crilly |
| 2011/0029157 | A1 | 2/2011 | Muzaffer |
| 2012/0015997 | A1 | 1/2012 | Maki et al. |
| 2012/0038316 | A1 | 2/2012 | Elias et al. |
| 2012/0133333 | A1 * | 5/2012 | Morioka ............. H01M 10/441 320/134 |
| 2012/0159971 | A1 | 6/2012 | Fink et al. |
| 2012/0223670 | A1 * | 9/2012 | Kinjo ....................... H02J 3/32 320/103 |
| 2013/0000342 | A1 | 1/2013 | Blasko et al. |
| 2013/0049457 | A1 * | 2/2013 | Komatsu .............. H02J 7/0014 307/9.1 |
| 2013/0241497 | A1 * | 9/2013 | Meguro .................. H01M 2/12 320/134 |
| 2013/0248165 | A1 * | 9/2013 | Kandasamy .......... F25D 29/003 165/271 |
| 2013/0320927 | A1 * | 12/2013 | Kumagai ................ H02J 7/007 320/126 |
| 2014/0172183 | A1 * | 6/2014 | Beeman ..................... H02J 3/32 700/291 |
| 2014/0354212 | A1 * | 12/2014 | Sugeno ............... H01M 10/441 320/103 |
| 2015/0171641 | A1 * | 6/2015 | Sato ...................... H02J 7/0013 320/107 |
| 2016/0322836 | A1 | 11/2016 | Muralidhar et al. |

FOREIGN PATENT DOCUMENTS

| | | | |
|---|---|---|---|
| CN | 201604567 | 10/2010 | |
| EP | 2645523 | 10/2013 | |
| EP | 2822138 A1 * | 1/2015 | ........... H02J 7/0013 |
| JP | 2005098623 | 4/2005 | |
| KR | 10-2010-0070594 | 6/2000 | |
| KR | 100629106 | 9/2006 | |
| WO | 0049699 | 8/2000 | |
| WO | 2010104960 | 9/2010 | |
| WO | 2012138500 | 10/2012 | |

OTHER PUBLICATIONS

International Search Report for International Application No. PCT/US2014/072316, dated Mar. 25, 2015 (3 pages).
Written Opinion for International Application No. PCT/US2014/072316, dated Mar. 25, 2015 (7 pages).
International Search Report for International Application No. PCT/US2013/078426, dated Apr. 24, 2014 (3 pages).
Supplementary European Search Report issued in corresponding European Application No. 14873350.4 dated Jul. 27, 2017 (11 pages).
Chinese Office Action issued in corresponding Chinese Application No. 201480071296.4 dated Oct. 24, 2017 (8 pages).

* cited by examiner

METHOD AND SYSTEM FOR CONFIGURING A TRANSPORT REFRIGERATION UNIT BATTERY CHARGER FOR USE IN A TRANSPORT REFRIGERATION SYSTEM

FIELD

The embodiments disclosed herein relate generally to a transport refrigeration unit (TRU) battery charger of a transport refrigeration system (TRS). More particularly, the embodiments relate to a method and system for configuring the TRU battery charger based on a battery topology of the TRU battery being charged.

BACKGROUND

A TRS is generally used to cool a refrigerated container (e.g., a container on a flat car, an intermodal container, etc.), a truck, a box car, or other similar transport unit (generally referred to as a "refrigerated transport unit"). Refrigerated transport units are commonly used to transport perishable items such as produce, frozen foods, and meat products. The refrigerated transport unit can have a controlled environmental condition (e.g., temperature, humidity, air quality, and the like) in a cargo space (conditioned space) during transport. Typically, a transport refrigeration unit (TRU) is attached to the refrigerated transport unit to control the environmental condition of the cargo space. The TRU can include, without limitation, a compressor, a condenser, an expansion valve, an evaporator, and fans or blowers to control the heat exchange between the air inside the cargo space and the ambient air outside of the refrigerated transport unit.

SUMMARY

The embodiments disclosed herein relate generally to a TRU battery charger of a TRS. More particularly, the embodiments relate to a method and system for configuring the TRU battery charger based on a battery topology of the TRU battery being charged.

The embodiments described herein allow for improved smart charging for batteries with different battery topologies (e.g., battery chemistries). In particular, the embodiments described herein provide a TRU battery charger that can provide a battery topology specific battery charging algorithm that is specific to the battery topology of the TRU battery equipped in the TRS as opposed to relying on a single battery charging algorithm that is designed to work for any battery topology.

The embodiments described herein also allow the TRU battery charger to charge an optional secondary TRU battery in parallel with the TRU battery while preventing the TRU battery from overcharging and out gassing.

An advantage of these embodiments is that a more efficient, precise and accurate charging of a TRU battery can be achieved, thereby reducing battery warranty costs, improving battery life of the TRU battery and providing an overall improved user experience.

In one embodiment, a method for configuring a TRU battery charger in a TRS is provided. The method includes receiving battery topology data indicating a battery topology of a TRU battery equipped in the TRS. The method also includes determining specific parameters for configuring a battery charging algorithm based on the battery topology data. Also, the method includes the TRU battery charger configuring the battery charging algorithm based on the specific parameters.

In another embodiment, a TRS for a refrigerated transport unit is provided. The TRS includes a refrigeration circuit including a compressor, a condenser, an evaporator, and a thermal expansion device. The TRS also includes a TRS controller configured to control the refrigeration circuit and to send battery topology data to a TRU battery charger. Also, the TRS includes a TRU battery configured to provide power to the TRS. The TRU battery charger includes a memory portion that stores a battery charging algorithm and a processor. The TRU battery charger is configured to charge the TRU battery, determine specific parameters for configuring a battery charging algorithm for charging the TRU battery based on the battery topology data, and configure the battery charging algorithm based on the specific parameters.

DRAWINGS

The foregoing and other features, aspects and advantages of the invention are apparent from the following detailed description taken in conjunction with the accompanying drawings in which like characters represent like parts throughout the drawings, wherein.

While the above-identified drawing figures set forth alternative embodiments, other embodiments are also contemplated, as noted in the discussion. In all cases, this disclosure presents illustrated embodiments by way of representation and not limitation. Numerous other modifications and embodiments can be devised by those skilled in the art which fall within the scope and spirit of the principles of this disclosure.

DETAILED DESCRIPTION

Figure 1:
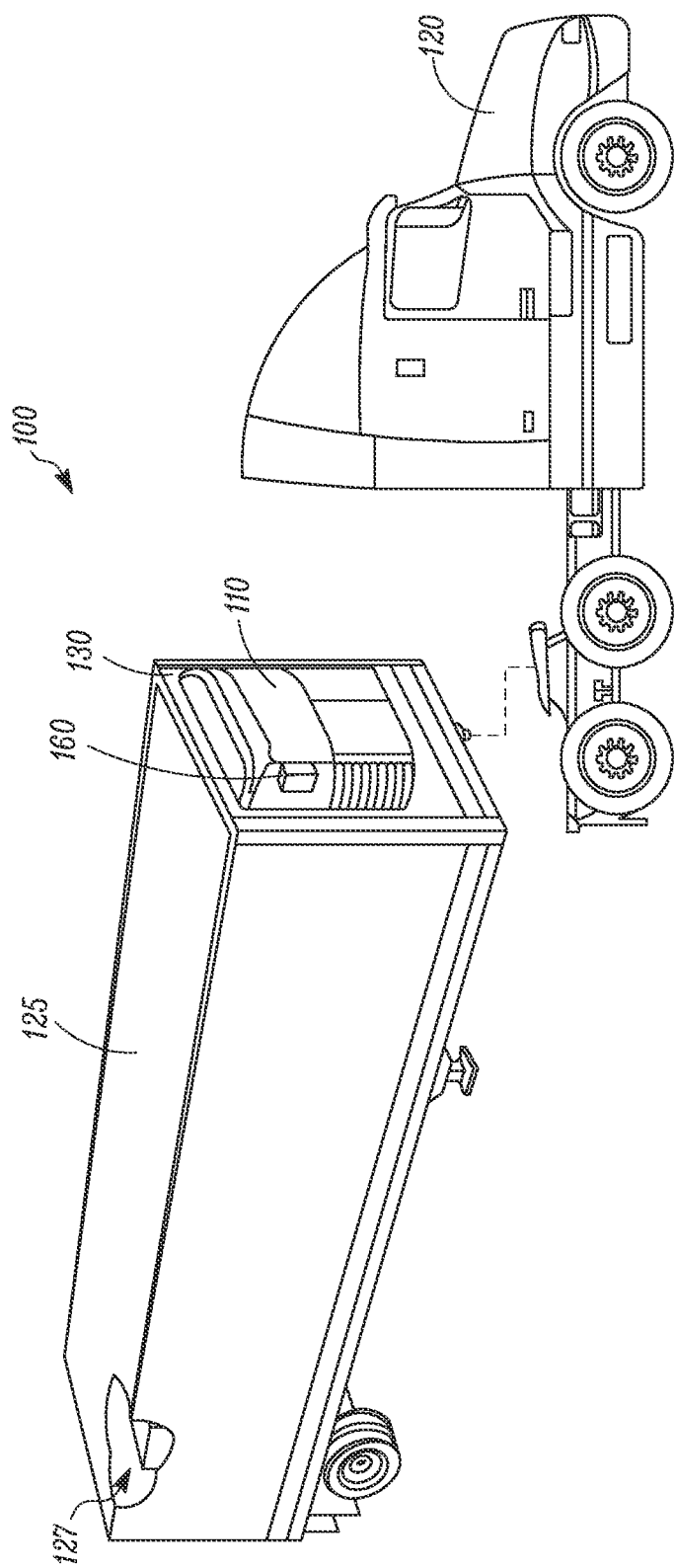
FIG. 1 illustrates one embodiment of a TRS comprising a TRU.

FIG. 1 illustrates one embodiment of a TRS 100 for a transport unit (TU) 125 that is attached to a tractor 120. The TRS 100 includes a TRU 110 that controls refrigeration within an internal space 127 of the TU 125. The TRU 110 is disposed on a front wall 130 of the TU 125. A tractor 120 is attached to and is configured to tow the transport unit 125. It will be appreciated that the embodiments described herein are not limited to trucks and trailer units, but can just as easily apply to any other suitable temperature controlled apparatuses such as a ship board container, an air cargo container or cabin, an over the road truck cabin, among others.

The TRU 110 can comprise a refrigeration circuit (not shown) and a power system (not shown) that are controlled by a programmable TRS Controller 155. In some embodiments, the refrigeration circuit can include a compressor, a condenser, an evaporator and a thermal expansion valve. The power system can include a prime mover (e.g., an engine) (not shown), a generator (e.g., a three phase AC generator) (not shown), a TRU battery (not shown) and a programmable/smart TRU battery charger (not shown) that together are configured to power the TU 125 while in transit. The TRS Controller 155 may comprise a single integrated control unit 160 or may comprise a distributed network of TRS control elements (not shown). The number of distributed control elements in a given network will depend upon the particular application of the principles described herein.

Figure 2:
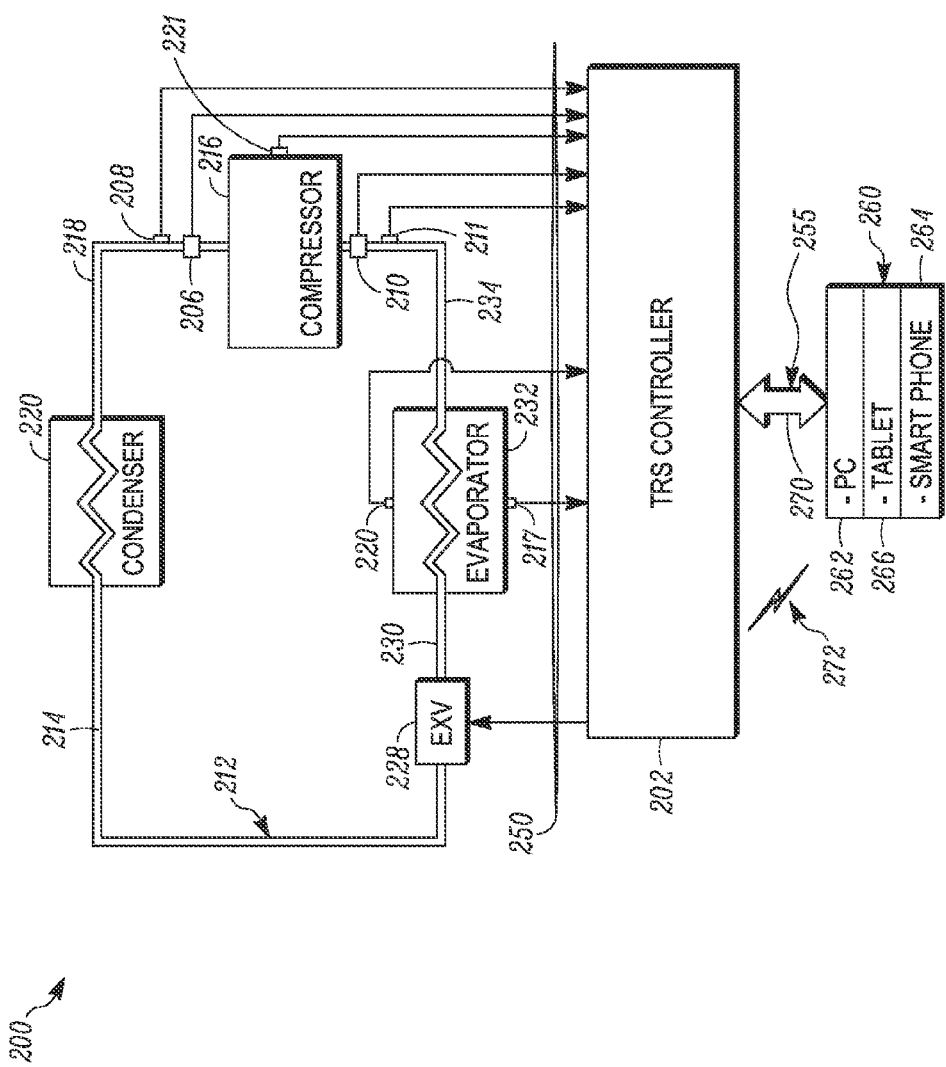
FIG. 2 is a schematic illustration of a TRU battery charger configuration system, according to one embodiment.

FIG. 2 is a schematic illustration of a TRU battery charger configuration system 200, according to one embodiment. The system 200 includes a TRU 201 that houses a programmable TRS controller 202, a refrigeration circuit 212, a human machine interface (HMI) 203, a telematics unit 204, a TRU battery charger 205 and a TRU battery 206. In some embodiments, the TRU 201 can also optionally house a secondary TRU battery 207.

The refrigeration circuit 212 generally defines the flow of fluid refrigerant through the TRU 200. A primary fluid path 214 is defined by a compressor 216, a discharge line 218, a condenser 220, a thermal expansion valve (EXV) 228, an evaporator input line 230, an evaporator 232, and a suction line 234. The compressor 216 is fluidly coupled to the condenser 220 by the discharge line 218. The condenser 220 is fluidly coupled to the EXV 228. The EXV 228 is fluidly coupled to the evaporator 232 by the evaporator input line 230. The primary fluid path 214 is completed via fluidic coupling of the evaporator 232 and the compressor 216.

Refrigerant in its various states flows through the primary fluid path 214 of the refrigerant circuit 212 as described herein. Vaporized refrigerant is delivered to the compressor 216 by the suction line 234. The compressor 216 compresses the vaporized refrigerant by increasing its temperature and pressure. The compressed, vaporized refrigerant is then delivered to the condenser 220 by the discharge line 218.

The condenser 220 receives compressed, vaporized refrigerant from the compressor 216. The condenser 220 is a heat exchanger apparatus used to remove heat from the refrigerant in order to condense the vaporized refrigerant into liquid refrigerant. In the condenser 220, the compressed, vaporized refrigerant releases heat to the air in communication with the condenser 220 in order to cool the vaporized refrigerant. The cooling action of the condenser 220 causes the state of the refrigerant to change from vapor to liquid.

While in the fluid path 214, the cool liquid refrigerant is then delivered to the EXV 228. The EXV 228 is a throttling device that restricts the flow of liquid refrigerant by forcing the liquid refrigerant through a small orifice causing the pressure of the liquid refrigerant to decrease, thereby lowering the boiling point of the refrigerant, making the refrigerant evaporate. As the liquid refrigerant passes through the small orifice of the EXV 228, the liquid refrigerant forms into liquid droplets.

The liquid refrigerant droplets are delivered to the evaporator 232 by evaporator input line 230. The liquid refrigerant droplets delivered to the evaporator 232 absorb heat from warm air flowing into the evaporator 232. The evaporator 232 is located within or in thermal communication with the space being conditioned by the transport refrigeration unit 200. Air is generally circulated between the conditioned space and the evaporator 232 by one or more evaporator fans (not shown). Generally, warmer air flows into the evaporator 232, the liquid refrigerant droplets absorb heat from the warmer air, and cooler air flows out of the evaporator 232. The cooler air flowing out of the evaporator 232 cools the masses in the conditioned space by absorbing heat from the masses within the conditioned space; the warmer air is circulated back to the evaporator 232 by the evaporator fans to be cooled again.

The liquid refrigerant droplets vaporize once they have absorbed sufficient heat, i.e. once the liquid refrigerant droplets reach their saturation or vaporization temperature at a given pressure. The refrigerant, which has changed from liquid refrigerant droplets back to vaporized refrigerant, is then delivered by suction line 234 back to the compressor 216. The delivery of the vaporized refrigerant back to the compressor 216 completes the flow of refrigerant through the fluid path 214.

With continued reference to FIG. 2, the programmable TRS controller 202 is configured to communicate with various components within the TRU 201 via rugged industrial grade communication links 209, 250 and to devices outside of the TRU 201 via a commercial grade communication link 255. The telematics unit 204 is also configured to communicate with devices outside of the TRU 201 via a commercial grade communication link 265.

The programmable TRS Controller 202 generally can include a processor (not shown), a memory (not shown), a clock (not shown) and an input/output (I/O) interface (not shown) and can be configured to receive data as input from various components within a TRS, and send command signals as output to various components within the TRS.

The TRS controller 201 can be configured to control various TRU 201 components such as, without limitation, the EXV 228, via the rugged industrial grade communication link 250 in response to data provided by, for example, a plurality of sensors that may comprise an evaporator input temperature sensor 217, an evaporator output temperature sensor 220, a suction pressure sensor 210, a compressor discharge pressure sensor 206, a suction temperature sensor 211, a compressor discharge temperature sensor 208, and at least one sensor 221 coupled to the compressor 216. It will be appreciated that numerous additional sensors or fewer sensors may be employed according to the principles described herein based upon a particular application.

The rugged industrial grade communication link 209 allows the programmable TRS controller 202 to communicate with the HMI 203, the telematics unit 204 and the TRU battery charger 205. In some embodiments, the rugged industrial grade communication link 209 is a multi-drop communication link that allows for communication between the TRS controller 202, the HMI 203, the telematics unit 204, the TRU battery charger 205, and also, for example, a wireless personal area network (WPAN) (not shown), a data logger (not shown), a third party communication device (not shown), etc. This allows for open communication between any of the components 202-205.

In other embodiments, the rugged industrial grade communication link 209 can be a master-slave communication link that allows for communication between, for example, the TRS controller 202 (acting as the master) and each of the slaves (e.g., the HMI 203, the telematics unit 204 and the TRU battery charger 205). Thus, only the component 202-205 designated as the master can communicate with the other components 202-205 designated as the slaves. Also, in some embodiments, the rugged industrial grade communication link 209 can be made up of one or more industrial grade communication buses.

The rugged industrial grade communication links 209, 250 can be, for example, a Controller Area Network (CAN) connection (e.g., a J1939 CAN connection), a RS45 connection, or any other rugged industrial grade communication bus that can be relied upon for stable and reliable communication between components in a TRS during transport.

The programmable TRS controller 202 and the telematics unit 204 are also programmed to communicate with various user devices 260, such as, without limitation, personal computers (PCs) 262, smart phones 264, tablets 266, and the like, via the suitable commercial grade communication links 255, 265. The commercial grade communication links 255, 265 may comprise for example, a wired communication link 270 such as a serial communication link, a USB communication link, etc. or a wireless communication link 272 such as a Wi-Fi data link, an infrared data link, a Bluetooth data link, a ZigBee data link, etc.

The programmable TRS controller 202 is also electrically connected with the TRU battery 206 and the TRU battery charger 205, such that the TRU battery 206 can provide power to the TRS controller 202 and the TRU battery charger 205 can charge the TRU battery 206 via the TRS controller 202. In some embodiments, the TRU battery charger 205 can be directly connected to the TRU battery 206 to allow the TRU battery charger 205 to directly charge the TRU battery 206.

Also, when present, the optional secondary battery 207 is electrically connected with the programmable TRS controller 202 such that the TRU battery charger 205 can charge the optional secondary TRU battery 207 via the TRS controller 202. In some embodiments, the TRU battery charger 205 can be directly connected to the optional secondary battery 207 to allow the TRU battery charger 205 to directly charge the optional secondary TRU battery 207.

The TRU battery 206 can be configured to provide power to the programmable TRS controller 202 and other components of a TRS (e.g., the TRS 100 shown in FIG. 1) including other components housed within the TRU 201 (e.g., condenser fan(s), evaporator fan(s), the HMI 203, the telematics unit 204, operation status display(s) (not shown), optional data logger(s) (not shown), any accessory device, etc.). In some embodiments, the TRU battery 206 can be a ~12 volt battery. The TRU battery 206 can be a proprietary battery designed specifically for use with the TRS or a third-party, off the shelf, battery that is compatible with the TRS being used. Also, in some embodiments, the TRS can be configured to be compatible with different types of proprietary batteries. Thus, the TRU battery 206 can have various battery topologies or battery chemistries including, for example, an absorbed glass mat (AGM) battery topology, a flooded lead acid battery topology, a deep cycle battery topology, a gel battery topology, a spiral lead acid battery topology, etc.

The optional secondary TRU battery 207 can be configured to provide power to, for example, lights (not shown) in an internal space of a refrigerated transport (e.g., the internal space 127 of the transport unit 125). In some embodiments, the optional secondary TRU battery 207 can be an AGM battery topology. In other embodiments, the optional secondary TRU battery 207 can be, for example, a flooded lead acid battery topology, a deep cycle battery topology, a gel battery topology, a spiral lead acid battery topology, etc.

The TRU battery charger 205 is a programmable electronic battery charger that generally can include a processor (not shown), a memory (not shown), a clock (not shown) and an input/output (I/O) interface (not shown) and can be configured to send and receive data with the TRS controller 202. The TRU battery charger 205 can be programmed with a three-stage charging algorithm that causes the TRU battery charger 205 to operate in a bulk current charging mode (e.g., a current limited, constant current or fast charging mode), an absorption mode (e.g., a constant voltage charging mode), and a float charging mode (e.g., a lower constant voltage or trickle charging mode).

In the bulk current charging mode, the TRU battery charger 205 delivers as much current as possible into the TRU battery 206 (and/or, when present, the optional secondary TRU battery 207). In the absorption mode (e.g., a constant voltage charging mode), the TRU battery charger 205 continues to charge the TRU battery 206 (and/or, when present, the optional secondary TRU battery 207) at a constant voltage subsequent to the bulk current charging mode. In the float charging mode, the TRU battery charger 205 continues to charge/maintain the TRU battery 206 (and/or, when present the optional secondary TRU battery 207) at lower currents and a lower voltage to prevent TRU battery 206 (and/or, when present, the optional secondary TRU battery 207) overcharging and out gassing. Accordingly, the TRU battery charger 205 can provide an efficient method of charging the TRU battery 206 and, when present, the optional secondary battery 207.

Also, the TRU battery charger 205 can be programmed to change characteristics of the three-stage charging algorithm that is used based on the topology of the TRU battery 206. Accordingly, a charging algorithm of the TRU battery charger 205 can be optimized for different battery topologies (e.g., an AGM battery topology, a flooded lead acid battery topology, a deep cycle battery topology, a gel battery topology, a spiral lead acid battery topology, etc.). For example, in some embodiments, the charging algorithm can be optimized by adjusting one or more bulk, absorption and/or float voltages to be used during a bulk current charging mode, an absorption mode, and a float mode respectively, one or more bulk current limits to be used during the bulk current charging mode, one or more voltage thresholds for changing from the bulk current charging mode to the absorption mode, one or more current levels for switching from the absorption mode to the float mode, etc. based on the battery topology. Thus, the TRU battery charger 205 can efficiently charge the TRU battery 206 regardless of the battery topology of the TRU battery 206. As described below with reference to FIG. 3, a user can configure the TRU battery charger 205 based on a battery topology of the TRU battery 206 equipped in the TRU 201.

For example in one embodiment, when the TRU battery 206 has an AGM battery topology, the TRU battery charger 205 can operate in the bulk current charging mode about 5% of the run time, in the absorption mode about 30% of the run time, in the float mode about 65% of the run time. Accordingly, when the run time is about 1 hour, the TRU battery charger 205 can operate in the bulk current charging mode for about 1 minute, the absorption mode for about 15 minutes and in the float mode for about 44 minutes.

Figure 3:
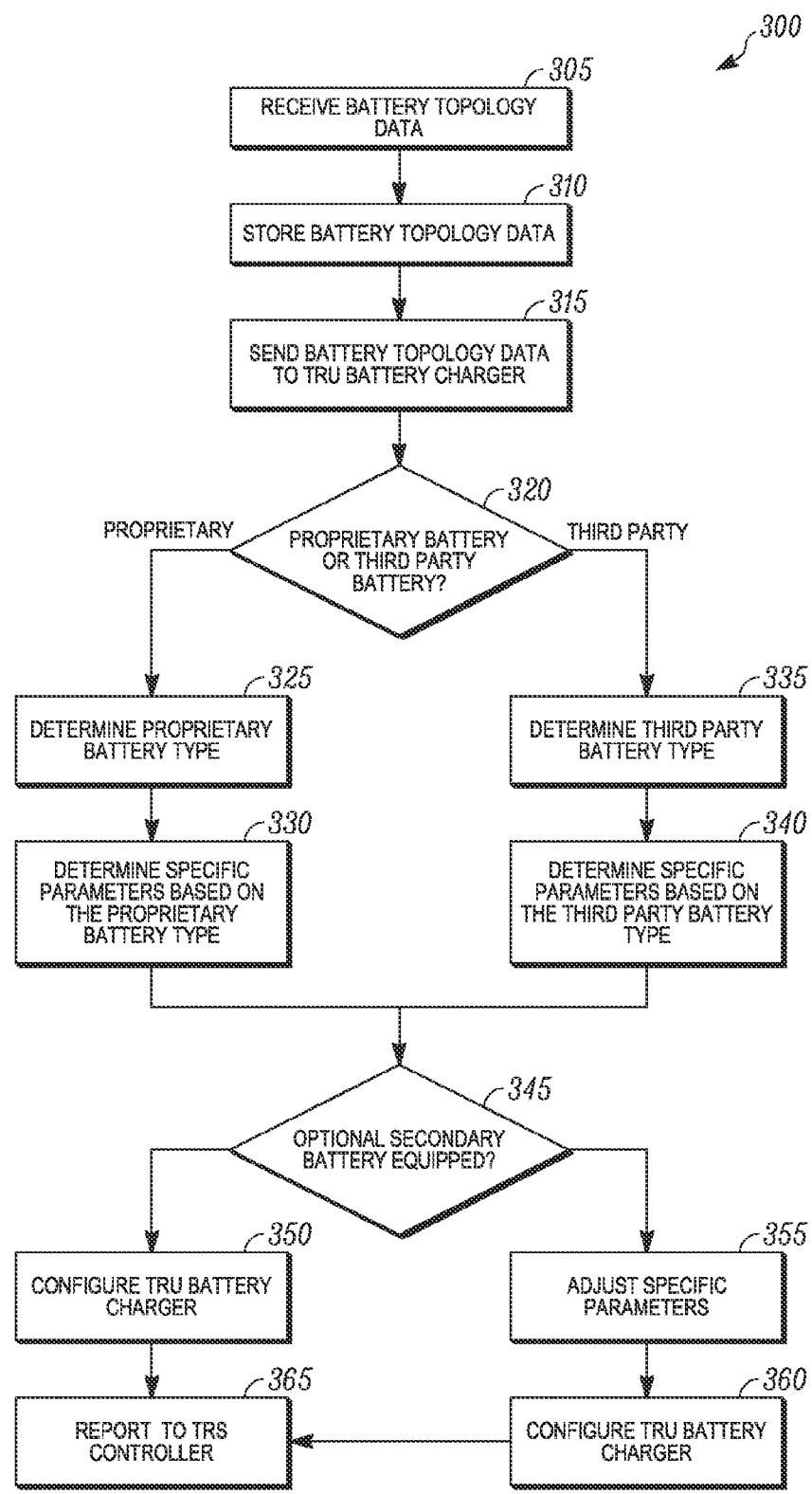
FIG. 3 is a flow chart showing a method for configuring a TRU battery charger based on a battery topology of the TRU battery being charged, according to one embodiment.

FIG. 3 is a flow chart showing a method 300 for configuring the TRU battery charger 205 based on a battery topology of the TRU battery 206 being charged, according to one embodiment. Accordingly, the TRU battery charger 205 can modify specific parameters used by a battery charging algorithm stored in the memory portion of the TRU battery charger 205 and operated by the processor of the TRU battery charger 205 regardless of what type of battery is equipped as the TRU battery 206. This can allow the TRU battery charger 205 to use a more efficient and precise battery charging algorithm than would be possible using a single charging algorithm that can accommodate any type of battery equipped as the TRU battery 206.

At 305, the TRU 201 receives battery topology data from a user. In some embodiments, the TRU 201 receives battery topology data from a user via at least one of the HMI 203, the telematics unit 204 or the TRS controller 202 over one of the commercial grade communication links 255, 265. The battery topology data is then stored, at 310, in a memory portion (e.g., a global data table) of the TRS controller 202. At 315, the TRS controller 202 sends the battery topology data to the TRU battery charger 205 via the rugged industrial grade communication link 209.

At 320, the TRU battery charger 205 determines whether the TRU battery 206 is a proprietary battery or a third party battery based on the battery topology data. If the TRU battery charger 205 determines that the TRU battery 206 is a proprietary battery, the method 300 proceeds to 325. If the TRS controller 202 determines that the TRU battery 206 is a third party battery, the method 300 proceeds to 335.

At 325, the TRU battery charger 205 determines what type of proprietary battery (e.g., a proprietary high-tier AGM battery, a proprietary flooded lead acid battery, a proprietary mid-tier AGM battery, a proprietary dead cell battery, a proprietary gel battery, a proprietary spiral lead acid battery, etc.) is equipped as the TRU battery 206 based on the battery topology data. At 330, the TRU battery charger 205 determines specific parameters to be used by the TRU battery charger 305 when operating the battery charging algorithm based on the type of proprietary battery equipped as the TRU battery 206. The method 300 then proceeds to 345.

At 335, the TRU battery charger 205 determines what type of third party battery (e.g., a generic AGM battery, a generic flooded lead acid battery, a generic dead cell battery, a generic gel battery, a generic spiral lead acid battery, etc.) is equipped as the TRU battery 206 based on the battery topology data. At 340, the TRU battery charger 205 determines specific parameters to be used by the TRU battery charger 305 when operating the battery charging algorithm based on the type of third party battery equipped as the TRU battery 206. The method 300 then proceeds to 345.

When the battery charging algorithm is the three-stage charging algorithm discussed above, the specific parameters can include, for example, one or more bulk, absorption and/or float voltages to be used during a bulk current charging mode, an absorption mode, and a float mode respectively, one or more bulk current limits to be used during the bulk current charging mode, one or more voltage thresholds for changing from the bulk current charging mode to the absorption mode, one or more current levels for switching from the absorption mode to the float mode, etc.

In some embodiments, the specific parameters can modify, for example, the percentage of time spent in each of the bulk current charging mode, the absorption mode and the float mode respectively. In some embodiments, the percentage of time spent in each of the bulk current charging mode, the absorption mode and the float mode can vary based on the charge level of the battery, the temperature of the battery and the battery topology of the battery. In some embodiments, the highest percentage of time is spent in the absorption mode, then the float mode and lastly the bulk current charging mode.

At 345, the TRU battery charger 205 determines whether the optional secondary TRU battery 207 is equipped in the TRU 201. If the optional secondary TRU battery 207 is equipped in the TRU 201, the method 300 proceeds to 350. If the optional secondary TRU battery 207 is not equipped in the TRU 201, the method 300 proceeds to 355.

At 350, the TRU battery charger 205 configures a battery charging algorithm (e.g., changes parameters of the battery changing algorithm) stored in the memory portion of the TRU battery charger 205 and operated by the processor of the TRU battery charger 205 based on the specific parameters. The method 300 then proceeds to 365.

At 355, the TRU battery charger 205 adjusts the specific parameters to the TRU battery charger 305. In some embodiments, the adjusted specific parameters configure the TRU battery charger 205 to be capable of effectively charging both the optional secondary TRU battery 207 and the TRU battery 206 in parallel. This can prevent the TRU battery charger 205 from charging the TRU battery 206 at a higher voltage than desired based on actual charge current drawn to the TRU battery 206. Charging the TRU battery 206 at a higher voltage than desired based on actual charge current drawn to the TRU battery 206 can lead to a failure to transition from a bulk charging mode to an absorption charging mode and/or from an absorption charging mode to a float charging mode, when the battery charging algorithm used by the TRU battery charger 205 is a three-stage charging algorithm. This can also lead to, for example, electrolyte boiling if the TRU battery 206 is a flooded lead acid battery and undesired hydrogen venting if the TRU battery 206 is an AGM battery. The method 300 then proceeds to 360.

When the battery charging algorithm is the three-stage charging algorithm discussed above, the adjusted specific parameters can include, for example, adjusting one or more bulk, absorption and/or float voltages to be used during the bulk current charging mode, the absorption mode, and the float mode respectively, one or more bulk current limits to be used during the bulk current charging mode, one or more voltage thresholds for changing from the bulk current charging mode to the absorption mode, one or more current levels for switching from the absorption mode to the float mode, etc. to account for the secondary TRU battery 207.

At 360, the TRU battery charger 205 configures a battery charging algorithm (e.g., changes parameters of the battery changing algorithm) stored in the memory portion of the TRU battery charger 205 and operated by the processor of the TRU battery charger 205 based on the adjusted specific parameters. The method 300 then proceeds to 365.

At 365, the TRU battery charger 205 reports the specific parameters (or, if applicable, the adjusted specific parameters) back to the TRS controller 202 to confirm the change in configuration of the TRU battery charger 205.

Aspects:

Any of aspects 1-11 can be combined with any of aspects 12-22.

Aspect 1. A method for configuring a transport refrigeration unit (TRU) battery charger in a transport refrigeration system (TRS), the method comprising:

receiving battery topology data indicating a battery topology of a TRU battery equipped in the TRS;

determining specific parameters for configuring a battery charging algorithm based on the battery topology data; and the TRU battery charger configuring the battery charging algorithm based on the specific parameters.

Aspect 2. The method of aspect 1, wherein the battery charging algorithm is a three-stage charging algorithm that includes a bulk current charging mode, an absorption charging mode and a float charging mode.

Aspect 3. The method of aspect 2, wherein the specific parameters include one or more of a bulk current limit to be used during the bulk current charging mode, a bulk voltage limit to be used during the bulk current charging mode, an absorption voltage to be used during the absorption charging mode, a float voltage to be used during the float charging mode, and a float current to be used during the float charging mode.

Aspect 4. The method of any of aspects 1-3, wherein the TRS controller storing the battery topology data in a memory portion of the TRS controller.

Aspect 5. The method of any of aspects 1-4, wherein the TRU battery charger determining the specific parameters.

Aspect 6. The method of any of aspects 1-5, further comprising:
determining whether the TRU battery is a proprietary battery or a third party battery based on the battery topology data.

Aspect 7. The method of aspect 6, further comprising:
determining the specific parameters based on whether the TRU battery is a proprietary battery or a third party battery.

Aspect 8. The method of any of aspects 1-7, further comprising:
determining whether a secondary TRU battery is equipped in the TRS;
adjusting the specific parameters for configuring the battery charging algorithm to account for the secondary TRU battery; and
the TRU battery charger configuring the battery charging algorithm based on the adjusted specific parameters.

Aspect 9. The method of aspect 8, wherein the TRU battery charger determining whether the secondary TRU battery is equipped in the TRS, and
wherein the TRU battery charger adjusting the specific parameters for configuring the battery charging algorithm to account for the secondary TRU battery.

Aspect 10. The method of any of aspects 1-9, further comprising:
the TRU battery charger reporting the specific parameters to the TRS controller.

Aspect 11. The method of any of aspects 1-10, further comprising receiving the battery topology data via one or more of the TRS controller, a human machine interface of the TRS, and a telematics unit of the TRS.

Aspect 12. A transport refrigeration system (TRS) for a refrigerated transport unit, comprising:
a refrigeration circuit including a compressor, a condenser, an evaporator, and a thermal expansion device;
a TRS controller configured to control the refrigeration circuit and to send battery topology data to a TRU battery charger;
a TRU battery configured to provide power to the TRS;
the TRU battery charger including a memory portion storing a battery charging algorithm and a processor, the TRU battery charger configured to charge the TRU battery, determine specific parameters for configuring a battery charging algorithm for charging the TRU battery based on the battery topology data, and configure the battery charging algorithm based on the specific parameters.

Aspect 13. The TRS of aspect 12, wherein the battery charging algorithm is a three-stage charging algorithm that includes a bulk current charging mode, an absorption charging mode and a float charging mode.

Aspect 14. The TRS of aspect 13, wherein the specific parameters include one or more of a bulk current limit to be used during the bulk current charging mode, a bulk voltage limit to be used during the bulk current charging mode, an absorption voltage to be used during the absorption charging mode, a float voltage to be used during the float charging mode, and a float current to be used during the float charging mode.

Aspect 15. The TRS of any of aspects 12-14, wherein the TRS controller including a memory portion, and
wherein the TRS controller is configured to store the battery topology data in the memory portion of the TRS controller.

Aspect 16. The TRS of any of aspects 12-15, wherein the TRU battery charger is configured to determine whether the TRU battery is a proprietary battery or a third party battery based on the battery topology data.

Aspect 17. The TRS of aspect 16, wherein the TRU battery charger is configured to determine the specific parameters based on whether the TRU battery is a proprietary battery or a third party battery.

Aspect 18. The TRS of any of aspects 12-17, wherein the TRU battery charger is configured to determine whether a secondary TRU battery is equipped in the TRS, to adjust the specific parameters for configuring the battery charging algorithm to account for the secondary TRU battery, and to configure the battery charging algorithm based on the adjusted specific parameters.

Aspect 19. The TRS of any of aspects 12-18, wherein the TRU battery charger is configured to report the specific parameters to the TRS controller.

Aspect 20. The TRS of any of aspects 12-19, further comprising a human machine interface configured to receive the battery topology data from a user.

Aspect 21. The TRS of any of aspects 12-20, further comprising a telematics unit configured to receive the battery topology data from a user.

Aspect 22. The TRS of any of aspects 12-21, wherein the TRS controller is configured to receive the battery topology data from a user.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

What is claimed is:

1. A method for a transport refrigeration unit (TRU) battery charger in a transport refrigeration system (TRS), the method comprising:
receiving or accessing battery topology data indicating a battery topology of a TRU battery equipped in the TRS;
determining specific parameters for configuring a battery charging algorithm based on the battery topology data, the specific parameters including a voltage or current parameter for charging the TRU battery;
determining whether a secondary TRU battery is equipped in the TRS;
receiving or accessing battery topology data indicating a battery topology of the secondary TRU battery equipped in the TRS;
adjusting the specific parameters for configuring the battery charging algorithm to account for the battery topology of the secondary TRU battery and a parallel charging configuration of the TRU battery and the secondary TRU battery;
the TRU battery charger configuring the battery charging algorithm based on the adjusted specific parameters;
the TRU battery charger concurrently charging both the TRU battery and the secondary TRU battery in parallel utilizing the battery charging algorithm based on the adjusted specific parameters.

2. The method of claim 1, wherein the battery charging algorithm is a three-stage charging algorithm that includes a bulk current charging mode, an absorption charging mode and a float charging mode.

3. The method of claim 2, wherein the voltage or current parameter includes at least one of a bulk current limit to be used during the bulk current charging mode, a bulk voltage limit to be used during the bulk current charging mode, an absorption voltage to be used during the absorption charging mode, a float voltage to be used during the float charging mode, and a float current to be used during the float charging mode.

4. The method of claim 1, wherein the TRS controller storing the battery topology data in a memory portion of the TRS controller.

5. The method of claim 1, wherein the TRU battery charger determines the specific parameters.

6. The method of claim 1, further comprising:
determining whether the TRU battery is a proprietary battery or a third party battery based on the battery topology data.

7. The method of claim 6, further comprising:
determining the specific parameters based on whether the TRU battery is a proprietary battery or a third party battery.

8. The method of claim 1, wherein the TRU battery charger determines whether the secondary TRU battery is equipped in the TRS, and
wherein the TRU battery charger adjusts the specific parameters for configuring the battery charging algorithm to account for the secondary TRU battery.

9. The method of claim 1, further comprising:
the TRU battery charger reporting the specific parameters to the TRS controller.

10. The method of claim 1, further comprising:
receiving the battery topology data via one or more of the TRS controller, a human machine interface of the TRS, and a telematics unit of the TRS.

11. A transport refrigeration system (TRS) for a refrigerated transport unit, comprising:
a refrigeration circuit including a compressor, a condenser, an evaporator, and a thermal expansion device;
a TRS controller configured to control the refrigeration circuit and to provide battery topology data to a TRU battery charger;
a TRU battery configured to provide power to the TRS;
the TRU battery charger including a memory portion storing a battery charging algorithm and a processor, the TRU battery charger configured to:
determine specific parameters for configuring the battery charging algorithm for charging the TRU battery based on the battery topology data, the specific parameters including a voltage or current parameter for charging the TRU battery;
determine whether a secondary TRU battery is equipped in the TRS;
adjust the specific parameters for configuring the battery charging algorithm to account for a battery topology of the secondary TRU battery and a parallel charging configuration between the TRU battery and the secondary TRU battery,
configure the battery charging algorithm based on the adjusted specific parameters, and
concurrently charge both the TRU battery and the secondary TRU battery in parallel utilizing the battery charging algorithm based on the adjusted specific parameters.

12. The TRS of claim 11, wherein the battery charging algorithm is a three-stage charging algorithm that includes a bulk current charging mode, an absorption charging mode and a float charging mode.

13. The TRS of claim 12, wherein the voltage or current parameter includes at least one of a bulk current limit to be used during the bulk current charging mode, a bulk voltage limit to be used during the bulk current charging mode, an absorption voltage to be used during the absorption charging mode, a float voltage to be used during the float charging mode, and a float current to be used during the float charging mode.

14. The TRS of claim 11, wherein the TRS controller including a memory portion, and
wherein the TRS controller is configured to store the battery topology data in the memory portion of the TRS controller.

15. The TRS of claim 11, wherein the TRU battery charger is configured to determine whether the TRU battery is a proprietary battery or a third party battery based on the battery topology data.

16. The TRS of claim 15, wherein the TRU battery charger is configured to determine the specific parameters based on whether the TRU battery is a proprietary battery or a third party battery.

17. The TRS of claim 11, wherein the TRU battery charger is configured to report the specific parameters to the TRS controller.

18. The TRS of claim 11, further comprising a human machine interface configured to receive the battery topology data from a user.

19. The TRS of claim 11, further comprising a telematics unit configured to receive the battery topology data from a user.

20. The TRS of claim 11, wherein the TRS controller is configured to receive the battery topology data from a user.

* * * * *